United States Patent [19]
Kirchberg et al.

[11] Patent Number: 5,343,379
[45] Date of Patent: Aug. 30, 1994

[54] CONTROL METHOD FOR INVERTERS HAVING DWELL TIMES BETWEEN SWITCH CONDUCTION PERIODS

[75] Inventors: Maurice A. Kirchberg, Dubuque, Iowa; Alexander Cook, Rockford, Ill.

[73] Assignee: Sundstrand Corporation, Rockford, Ill.

[21] Appl. No.: 973,120

[22] Filed: Nov. 6, 1992

[51] Int. Cl.$^5$ .................. H02M 1/08; H02M 1/12
[52] U.S. Cl. ............................. 363/41; 363/95; 363/98
[58] Field of Search ............. 363/40, 41, 42, 95, 363/97, 98, 131, 132

[56] References Cited

U.S. PATENT DOCUMENTS

| | | | |
|---|---|---|---|
| 3,648,150 | 3/1972 | Kernick et al. | 363/41 |
| 4,382,275 | 5/1983 | Glennon | 363/41 |
| 4,480,299 | 10/1984 | Muto et al. | 363/41 |
| 4,527,226 | 7/1985 | Glennon | 363/41 |
| 4,595,976 | 6/1986 | Parro, II | 363/41 |
| 4,626,979 | 12/1986 | JaQuay | 363/41 |
| 4,635,177 | 1/1987 | Shekhawat et al. | 363/41 |
| 4,646,221 | 2/1987 | Sekino et al. | 363/41 |
| 4,757,432 | 7/1988 | Hancock | 363/17 |
| 4,757,434 | 7/1988 | Kawabata | 363/41 |
| 4,772,996 | 11/1988 | Hanei et al. | 363/41 |
| 4,800,478 | 1/1989 | Takahashi | 363/41 |
| 4,961,130 | 10/1990 | Kirchberg et al. | 363/41 |
| 5,001,619 | 3/1991 | Nakajimi et al. | 363/41 |
| 5,034,876 | 7/1991 | Kirchberg, Jr. et al. | 363/97 |
| 5,115,386 | 5/1992 | Shirahama et al. | 363/41 |

*Primary Examiner*—Jeffrey L. Sterrett
*Attorney, Agent, or Firm*—Marshall, O'Toole, Gerstein, Murray & Borun

[57] ABSTRACT

A method of modeling a response of an inverter having a pair of switches which are alternately operated to alternately connect first and second voltages to an inverter output to develop an inverter output voltage includes the steps of assuming the inverter output voltage is substantially at or between the first and second voltages during a dwell interval and modeling the inverter response based upon such assumption. The modeling may be used as part of a control strategy for an inverter wherein output harmonic content is minimized.

23 Claims, 3 Drawing Sheets

CONTROL METHOD FOR INVERTERS HAVING DWELL TIMES BETWEEN SWITCH CONDUCTION PERIODS

TECHNICAL FIELD

The present invention relates generally to power conversion systems and methods, and more particularly to a method of controlling an inverter which converts DC power into AC power.

BACKGROUND ART

Inverters have long been used to convert DC power into AC power for one or more AC loads. An inverter may be of the pulse-width modulated (PWM) type having a pair of switches which are operated in accordance with a PWM pattern to produce output power having a substantial fundamental component and harmonics thereof. An inverter control detects an operational parameter, such as load magnitude, at a point of regulation (POR) and selects an appropriate PWM pattern based upon such detected parameter. In this way, the output of the inverter may be regulated.

Kirchberg, Jr., et al., U.S. Pat. No. 5,034,876, assigned to the assignee of the instant application and the disclosure of which is hereby incorporated by reference herein, discloses an inverter which is controlled by a PWM controller wherein the latter is responsive to the voltage magnitude and current magnitude at the POR. The PWM controller selects a provisional PWM pattern from a memory, models the response of the inverter and filter coupled to the output of the inverter based upon the assumption that the inverter is controlled in accordance with the provisional PWM pattern and checks to determine whether the inverter output developed from the modeled response contains harmonic content less than a specified magnitude. If so, the provisional PWM pattern is thereafter used to actually control the inverter. If the harmonic content in the modeled inverter output is greater than the specified magnitude, a different PWM pattern is provisionally selected and the response of the inverter and filter is again modeled, this time using the newly provisionally selected PWM pattern. If the modeled inverter output contains harmonic content less than the specified magnitude, then the newly provisionally selected PWM pattern is used to control the inverter switches. Otherwise, yet another PWM pattern is provisionally selected and the process is repeated until a pattern is found which results in the modeled inventer output having harmonic content less than the specified magnitude.

Inverters of the high-power type typically utilize series-connected pairs of high power switches which have substantial turnoff times. Typically, a fixed dwell interval is interposed between turn off of one switch and turn on of the other switch of the pair to prevent short circuiting of the DC link coupled to the inverter input. In such a system, the output voltage of the inverter can be indeterminate during the dwell interval. The resulting inability to accurately predict the actual point at which the output voltage switched between positive and negative voltage levels resulted in the inability to select an optimum PWM pattern for the inverter switches, in turn resulting in the inability to develop a PWM output having minimized harmonic content. As a result, the output filter coupled to the inverter had to be sized to account for this increased harmonic content, thereby undesirably increasing the size and weight of the overall inverter system. This increase in size and weight is particularly disadvantageous in applications where size and weight must be kept to a minimum, such as in aircraft.

Inverter controls are also disclosed in Kernick, et al., U.S. Pat. No. 3,648,150, Glennon, U.S. Pat. Nos. 4,382,275 and 4,527,226, Parro, II, U.S. Pat. No. 4,595,976, JaQuay, U.S. Pat. No. 4,626,979, Shekhawat, et al., U.S. Pat. No. 4,635,177, Sekino, et al., U.S. Pat. No. 4,646,221, Hancock, U.S. Pat. No. 4,757,432, Kawabata, et al., U.S. Pat. No. 4,757,434, Hanei, et al., U.S. Pat. No. 4,772,996, Muto, et al., U.S. Pat. No. 4,480,299 and Takahashi, U.S. Pat. No. 4,800,478.

SUMMARY OF THE INVENTION

In accordance with the present invention, an inverter control method accounts for the inverter output during the dwell period between turn off of an inverter switch and turn on of the other switch of the inverter pair in an improved fashion so that output harmonics are minimized.

More particularly, in accordance with one aspect of the present invention, an improvement in a method of modeling a response of an inverter having a pair of switches which are alternately operated to alternately connect first and second voltages to an inverter output to develop an inverter output voltage wherein a dwell period is interposed between turn off of one switch and turn on of the other switch includes the steps of assuming that the inverter output voltage is substantially at or between the first and second voltages during the dwell interval and modeling the inverter response based upon such assumption.

In accordance with one embodiment, the assumed level is substantially constant throughout the dwell interval and, also preferably, is substantially midway between the first and second voltages. In accordance with another embodiment, the assumed level is substantially at the first or the second voltage.

According to a further aspect of the present invention, a method of controlling an inverter having a pair of switches which are alternately operated to alternately connect first and second voltages to an inverter output to develop an inverter output voltage wherein a dwell period is interposed between turn off of one switch and turn on of the other switch includes the steps of detecting an operational parameter of the inverter, selecting a switch control pattern in dependence upon the detected operational parameter and modeling a response of the inverter under the assumptions that the switches are to be controlled in accordance with the selected switch control pattern and that the inverter output voltage is at a level in a range between and including the first and second voltages during the dwell interval. A determination is made whether the modeled inverter response satisfies a certain criterion and, if so, the inverter switches are operated in accordance with the selected switch control pattern.

In accordance with still another aspect of the present invention, a method of controlling an inverter having a pair of switches which are alternately operated to alternately connect first and second voltages to an inverter output to develop an inverter output voltage wherein a dwell period is interposed between turn off of one switch and turn on of the other switch includes the steps of assuming a certain level for an operational parameter of the inverter, selecting a switch control pattern for the inverter switches and modeling a response of the inverter. The modeled response is based on the assumptions that the switches are to be controlled in accordance with the selected switch control pattern and that the inverter output voltage is at a particular level between the first and second voltages during the dwell interval. A determination is made whether the modeled inverter response satisfies a certain criterion and, if so, the selected switch control pattern is stored in a memory if the modeled inverter response satisfies the certain criterion. The selected switch control pattern is retrieved from the memory and the inverter switches are operated in accordance with the switch control pattern when the operational parameter of the inverter is substantially at the certain level.

The method of the present invention limits the possible error in the modeling of the inverter that arises due to the indeterminate nature of the inverter output under low current magnitude conditions, and hence output harmonics can be minimized, thereby minimizing output filter size and weight.

DESCRIPTION OF THE PREFERRED EMBODIMENTS

Figure 1:
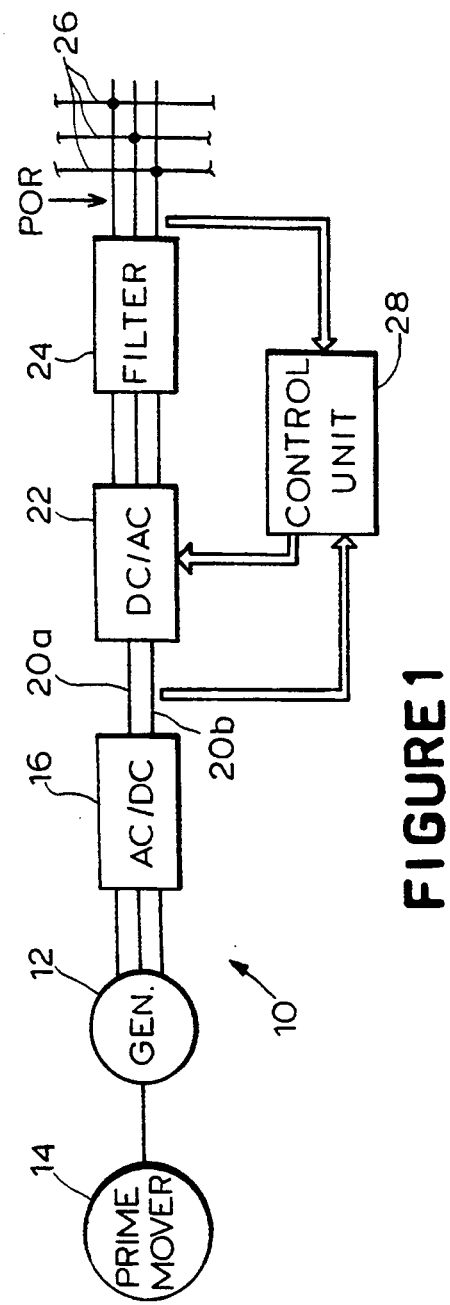
FIG. 1 comprises a block diagram of a power conversion system incorporating the present invention.

Referring now to FIG. 1, a variable-speed, constant-frequency (VSCF) power conversion system 10 includes a brushless, synchronous generator 12 driven by a variable-speed prime mover 14 wherein the latter may be, for example, an aircraft jet engine. The generator 12 develops output power at a frequency which is variable in dependence upon the speed of the prime mover 14. The variable-frequency power developed by the generator 12 is converted into DC power by an AC/DC converter in the form of a rectifier bridge 16 to produce first and second DC voltages $V_{DC}+$ and $V_{DC}-$ on first and second DC link conductors 20a, 20b, respectively. These DC voltages are provided to a single-phase or polyphase DC/AC converter or inverter 22 which may be coupled to an optional output filter 24. The filter 24 is connected to one or more loads over a load bus 26. One or more operational parameters at a point of regulation (POR) at or near the load bus 26 as well as one or more operational parameters on the DC link conductors 20a, 20b are provided to a control unit 28, which in turn develops switch control signals for switches in the inverter 22.

Figure 2:
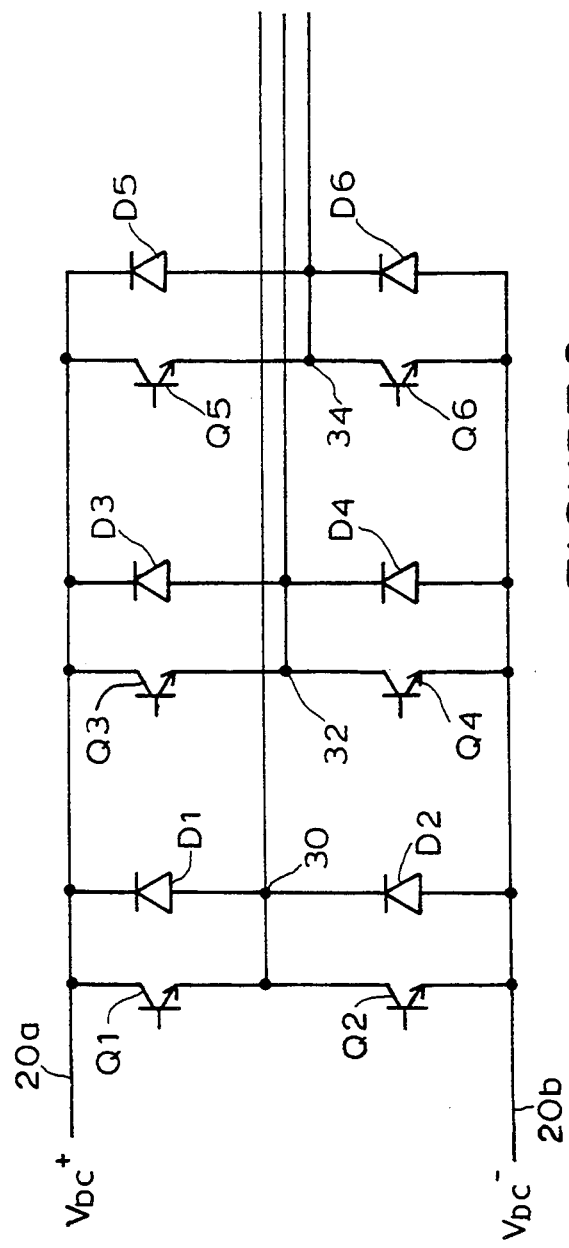
FIG. 2 is a simplified schematic diagram of the inverter of FIG. 1.

As seen in FIG. 2, the inverter 22 includes first through sixth power switches Q1-Q6 together with associated anti-parallel or flyback diodes D1-D6 connected in a conventional three-phase bridge configuration. In the event the inverter 22 is of the single-phase type, only one of the inverter legs, for example the leg including the switches Q1, Q2 and the diodes D1 and D2, would be used. The switches Q1-Q6 are connected between the DC link conductors 20a, 20b and inverter phase outputs 30, 32 and 34.

Figure 3:
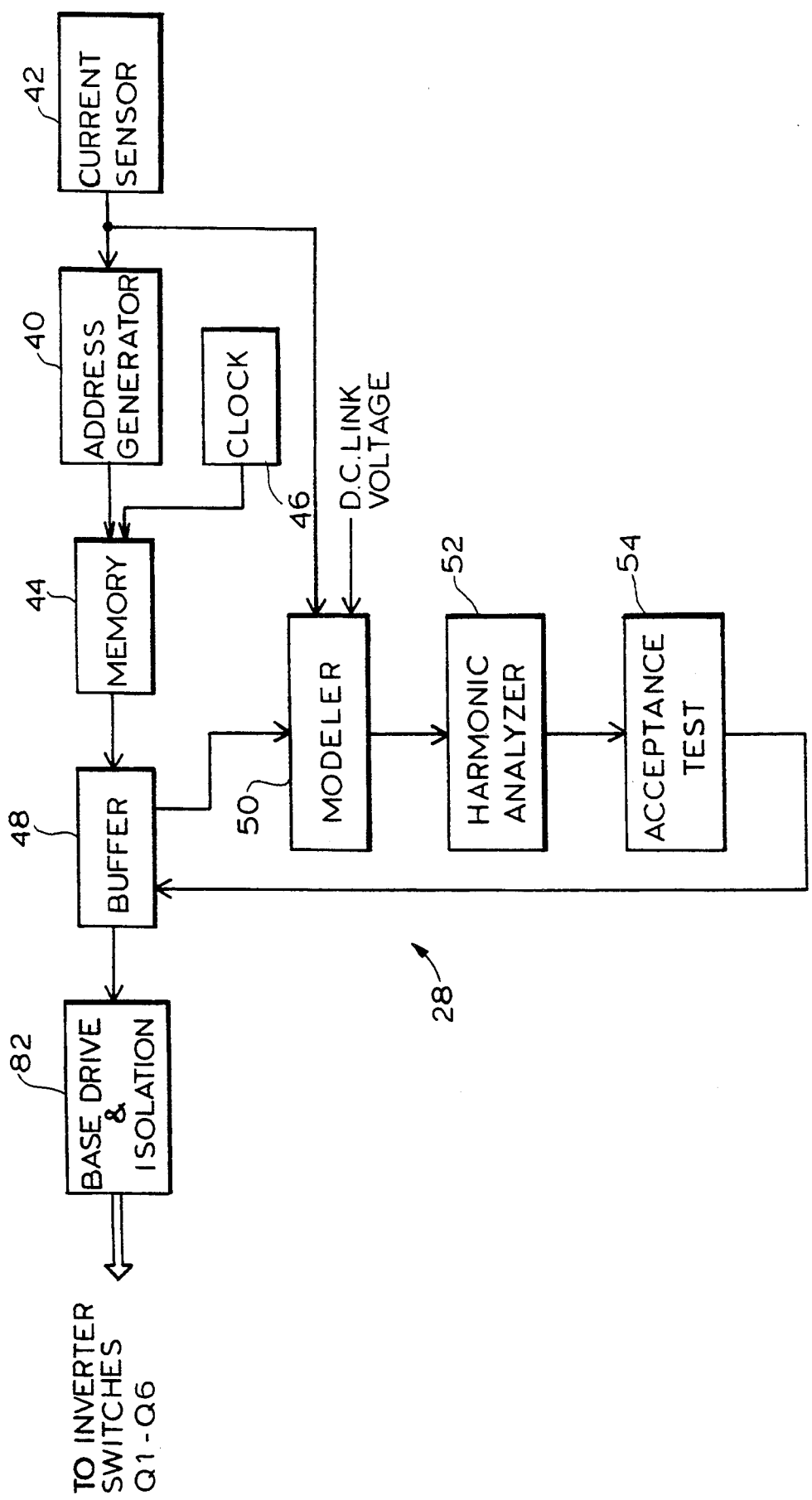
FIG. 3 comprises a block diagram of a portion of the control unit of FIG. 1.

FIG. 3 illustrates a portion of the control unit 28 in greater detail. It should be understood that the control unit 28 may be implemented by a processor which executes suitable programming to undertake the functions described in connection with FIG. 3. The control unit 28 may alternatively be implemented by hardware or a combination of hardware and software, as desired. The control unit 28 includes an address generator 40 which is responsive to a current sensor 42 that detects the current magnitude flowing in one of the phase outputs 30-34 of the inverter 22. The current sensor 42 may alternatively detect the magnitude of the greatest phase current produced by the inverter 22 or the average of the phase currents, if desired.

The address generator 40 develops an addressing signal for a memory 44 which stores a plurality of pulse-width modulated PWM patterns. Each pattern is stored as a series of zeroes and ones where a zero represents a first inverter output condition, such as a notch, whereas a one represents an opposite inverter condition, such as a pulse. The zeroes and ones are stored in contiguous memory locations and are sequentially accessed by the address generator 40 and a clock 46 so that the zeroes and ones are sequentially provided to a buffer 48. The PWM pattern provisionally selected from the memory 44 is not immediately implemented to control the inverter 40. Rather, the pattern stored in the buffer 48 is coupled to a modeler 50 which models the response of the inverter 22 and the filter 24 under the assumption that the PWM waveform provisionally selected from the memory 44 and stored in the buffer 48 is to be used to control the switches Q1-Q6 and under the further assumptions that the detected inverter output current and the voltage across the DC link conductors 20a, 20b are at their present levels. Preferably, the modeler has a fast response and may be implemented by software or hardware, as noted above. The modeler 50 simulates the inverter output under the foregoing assumptions and provides such output to a harmonic analyzer 52. The analyzer 52, which may implement a Fast Fourier Transform algorithm or another suitable algorithm, detects the magnitudes of various harmonics in the modeled inverter output. These magnitudes are analyzed and checked against an acceptance criterion by a block 54 to determine whether the provisionally selected PWM pattern will result in an inverter output having no greater than a specified harmonic content.

Figure 4:
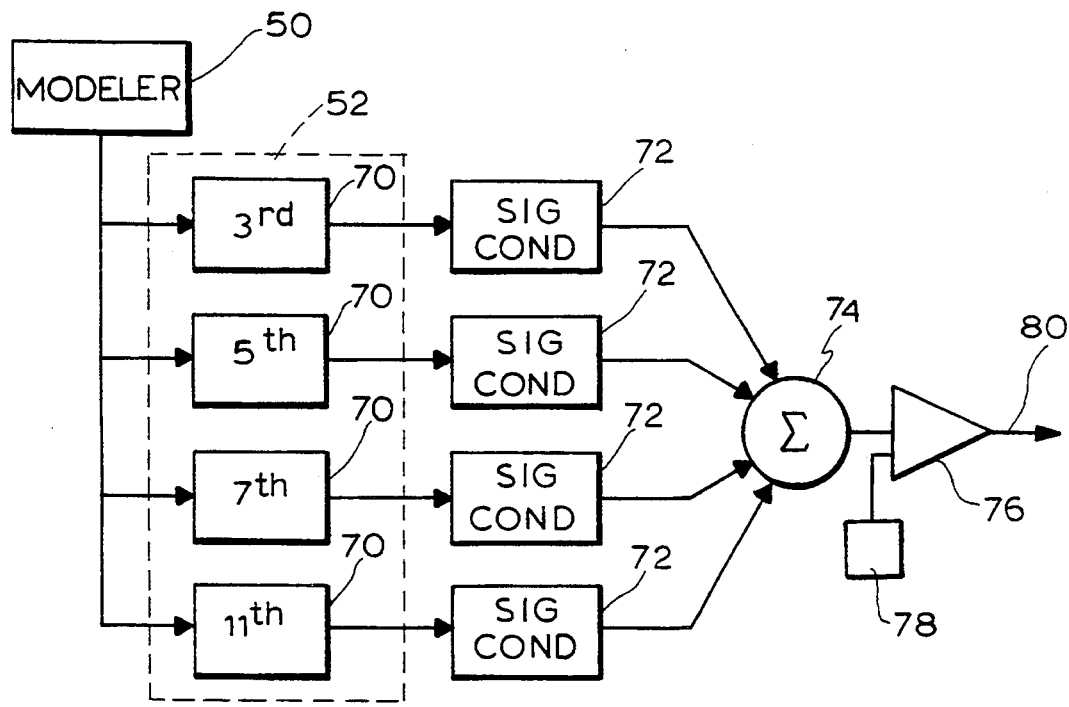
FIG. 4 comprises a more specific block diagram of the harmonic analyzer and acceptance test blocks of FIG. 3.

One possible implementation of the blocks 52 and 54 is shown in FIG. 4, it being understood that other possible implementations are described in Kirchberg, Jr., et al., U.S. Pat. No. 5,034,876, the disclosure of which is hereby incorporated by reference herein. The output of the modeler 50 is supplied to individual harmonic magnitude detectors 70 which detect the magnitudes of selected harmonics, such as the third, fifth, seventh and eleventh harmonics. The signals developed by the harmonic magnitude detectors 70 are supplied to signal conditioning circuits 72 and a summer 74. The output of the summer 74 represents the sum of the magnitudes of the detected harmonics and this output is compared by a comparator 76 against a reference provided by a reference signal generator 78. If the harmonic content due to the presence of these harmonics is less than the reference provided by the generator 78, the comparator 76 indicates acceptance of the provisionally selected PWM pattern by developing a signal on a line 80 which is in turn supplied to the buffer 48. This signal causes the buffer 48 to supply the provisionally selected PWM pattern to a series of base drive and isolation circuits 82 which in turn develop switch control signals for operating the inverter switches Q1–Q6 in accordance with the selected PWM pattern.

If the provisionally selected PWM pattern does not result in a modeled inverter response that satisfies the certain criterion, a further PWM pattern is provisionally selected and the modeling and testing are again undertaken. If this pattern is found to be acceptable, the buffer 48 is instructed to provide this pattern to the base drive and isolation circuit 82. Otherwise, further switch control patterns are selected until the certain criterion is satisfied.

As should be evident from the foregoing discussion, the embodiment described above comprises an on-line technique for selecting PWM patterns from the memory 44 during operation of the inverter 22. According to an alternative embodiment of the present invention, the memory 44 may be loaded with PWM switch control patterns on an off-line basis by modeling the inverter output based upon the foregoing assumptions. That is, a plurality of PWM patterns are stored in the memory 44 prior to operation of the inverter 22 wherein each pattern is associated with a particular load magnitude. The PWM patterns are determined by selecting a provisional pattern for each load magnitude, modeling the inverter output based upon the assumption that the provisionally selected PWM pattern is used to operate the inverter switches and based upon an assumed level for the DC link voltage and assumed inverter characteristics, checking to determine if the modeled inverter output satisfies a certain criterion, such as total harmonic content and, if so, storing the provisionally selected PWM pattern in the memory. Thereafter, during operation of the inverter the load magnitude is detected and the PWM pattern associated therewith, or the PWM pattern most closely associated therewith, is selected from the memory and used to operate the inverter switches.

Figure 5:
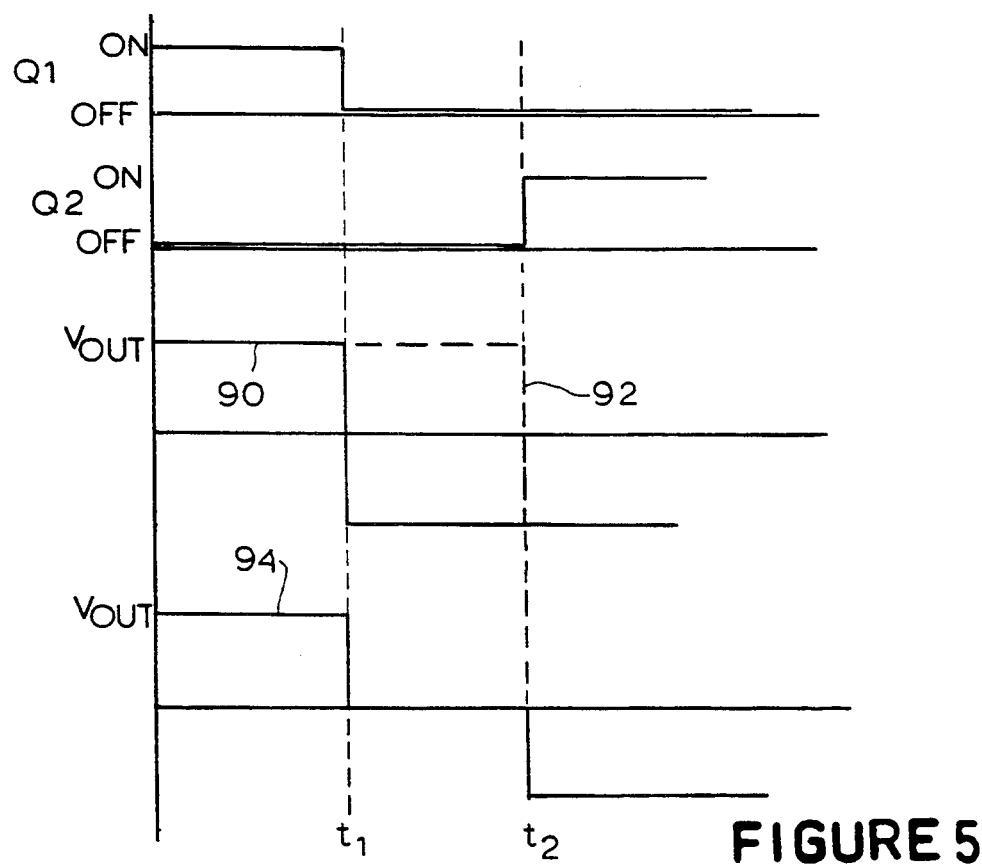
FIG. 5 is a series of waveform diagrams illustrating the operation of the present invention.

FIG. 5 illustrates the timing of the switches Q1 and Q2, it being understood that the switches Q3, Q4, and Q5, Q6 are operated similarly, except with 120° and 240° phase displacements, respectively. At a time $t_1$, the switch Q1 is initially turned off. Upon turn off of the switch Q1, a dwell interval or period begins and extends until a time $t_2$, at which time the switch Q2 is turned on. This dwell interval permits the switch Q1 to fully turn off before turn on of the switch Q2. The output voltage produced at the phase output 30 is dependent upon the level of current flowing through such phase output at the time of turn off of the switch Q1. If the current is above a specified threshold, and if the current is flowing through the switch Q1 at the time of turn off thereof, the phase output voltage immediately switches at the time $t_1$ to a level substantially equal to $V_{DC}^-$ (ignoring the voltage drop across the diode D2). If the current is above the specified threshold and is flowing through the diode D1 at the time of turn off of the switch Q1, the output voltage at the phase output 30 does not change to the level $V_{DC}^-$ until the end of the dwell interval at the time $t_2$.

On the other hand, if the current flowing through the phase output 30 is less than the specified threshold, the output voltage developed at the phase output 30 will be indeterminate during the dwell interval or will slowly change between $V_{DC+}$ and $V_{DC-}$; that is, the voltage may be at any level between the levels $V_{DC}^+$ and $V_{DC}^-$. This indeterminate status is due to the impedances of the inverter switches, the filter, the feeders and the loads connected to the inverter. In the modeling undertaken by the block 50, if the indeterminate status of the output voltage when the output current is below a specified threshold is not taken into account, undesired levels of harmonics can be introduced into the inverter output, thereby requiring the use of a relatively large and heavy filter. According to one embodiment of the present invention, an assumption is made by the modeler 50 that the output voltage at the phase output 30 changes between $V_{DC+}$ and $V_{DC-}$ either at the time $t_1$ or the time $t_2$ and that the output voltage is at one of the levels $V_{DC+}$ or $V_{DC-}$ during the dwell interval between the times $t_1$ and $t_2$. These assumptions are illustrated by the modeled inverter output waveforms 90, 92 wherein the voltage changes between $V_{DC}^+$ and $V_{DC}^-$ at the times $t_1$ and $t_2$, respectively. An inverter model based upon one of these assumptions results in the possibility of a maximum error between the assumed output voltage and the actual output voltage equal to $V_{DC+}$-$V_{DC-}$ during the dwell period due to the fact that the output voltage might be assumed to be at the voltage $V_{DC}^+$ when it actually would be at the voltage $V_{DC}^-$, or vice versa.

As illustrated by the waveform 94 of FIG. 5, according to a further embodiment of the present invention, an assumption is made by the modeler 50 that the output voltage at the phase output 30 is at a level between the voltages $V_{DC}^+$ and $V_{DC}^-$ during the dwell interval between the times $t_1$ and $t_2$. Preferably, it is assumed that the output voltage at the phase output 30 remains at a substantially constant voltage substantially midway between the voltages $V_{DC}^+$ and $V_{DC}^-$. Under this assumption the maximum possible error between the assumed output and actual output is limited to one-half the voltage across the DC link conductors 20a, 20b. Thus, error is minimized and harmonic content in the inverter output can be reduced so that the size and weight of the filter 24 can also be reduced.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

We claim:

1. In a method of modeling a response of an inverter having a pair of switches which are alternately operated to alternately connect first and second voltages to an inverter output to develop an inverter output voltage wherein a dwell period is interposed between turn-off of one switch and turn-on of the other switch, the improvement comprising the steps of:

(a.) assuming that the inverter output voltage level is substantially at or between the first and second voltages during the dwell interval; and (b.) modeling the inverter response based upon the assumed inverter output voltage level.

2. The improvement of claim 1, wherein the assumed inverter output voltage level is substantially constant through the dwell interval.

3. The improvement of claim 1, wherein the assumed inverter output voltage level is substantially midway between the first and second voltages.

4. The improvement of claim 1, wherein the assumed inverter output voltage level is substantially equal to the first voltage.

5. The improvement of claim 1, wherein the assumed inverter output voltage level is substantially equal to the second voltage.

6. A method of controlling an inverter having a pair of switches which are alternately operated to alternately connect first and second voltages to an inverter output to develop an inverter output voltage wherein a dwell period is interposed between turn-off of one switch and turn-on of the other switch, the method comprising the steps of:
- (a.) detecting an operational parameter of the inverter;
- (b.) selecting a switch control pattern in dependence upon the detected operational parameter;
- (c.) modeling a response of the inverter under the assumptions that the switches are to be controlled in accordance with the selected switch control pattern and that the inverter output voltage is at a level in a range between and including the first and second voltages during the dwell interval;
- (d.) determining whether the modeled inverter response satisfies a certain criterion; and
- (e.) operating the inverter switches in accordance with the selected switch control pattern if the modeled inverter response satisfies the certain criterion.

7. The method of claim 6, wherein the assumed inverter output voltage level is substantially constant throughout the dwell interval.

8. The method of claim 7, wherein the assumed inverter output voltage level is substantially midway between the first and second voltages.

9. The method of claim 7, wherein the assumed inverter output voltage level is substantially equal to the first voltage.

10. The method of claim 7, wherein the assumed inverter output voltage level is substantially equal to the second voltage.

11. The method of claim 6, wherein the switch control pattern comprises a pulse-width modulated pattern.

12. The method of claim 6, wherein the step of determining whether the modeled inverter response satisfies a certain criterion comprises the step of detecting a magnitude of a harmonic in the inverter output voltage and ascertaining whether the detected harmonic magnitude is greater than a certain magnitude.

13. The method of claim 6, wherein the step of detecting an operational parameter of the inverter comprises the step of detecting load magnitude at a point of regulation.

14. The method of claim 13, wherein the step of selecting a switch control pattern in dependence upon the detected operational parameter comprises the step of basing the selection of a switch control pattern on the detected load magnitude.

15. The method of claim 14, wherein the step of selecting a switch control pattern in dependence upon the detected operational parameter further comprises the step of selecting the switch control pattern from a plurality of switch control patterns stored in a memory.

16. The method of claim 6, including the further steps of:
- (f.) selecting a further switch control pattern if the modeled inverter response does not satisfy the certain criterion; and
- (g.) repeating the steps of modeling a response of the inverter under the assumptions that the switches are to be controlled in accordance with the selected switch control pattern and that the inverter output voltage is at a level in a range between and including the first and second voltages during the dwell interval, determining whether the modeled inverter response satisfies a certain criterion, and operating the inverter switches in accordance with the selected switch control pattern if the modeled inverter response satisfies the certain criterion for the further switch control pattern.

17. A method of controlling an inverter having a pair of switches which are alternately operated to alternately connect first and second voltages to an inverter output to develop an inverter output voltage wherein a dwell period is interposed between turn-off of one switch and turn-on of the other switch, the method comprising the steps of:
- (a.) assuming a certain level for an operational parameter of the inverter;
- (b.) selecting a switch control pattern for the inverter switches;
- (c.) modeling a response of the inverter under the assumptions that the switches are to be controlled in accordance with the selected switch control pattern and that the inverter output voltage is at a particular level between the first and second voltages during the dwell interval;
- (d.) determining whether the modeled inverter response satisfies a certain criterion;
- (e.) storing the selected switch control pattern in a memory if the modeled inverter response satisfies the certain criterion; and
- (f.) retrieving the selected switch control pattern from the memory and operating the inverter switches in accordance with the switch control pattern when the operational parameter of the inverter is substantially at the certain level.

18. The method of claim 17, including the further steps of
- (g.) assuming a further level for the operational parameter of the inverter,
- (h.) selecting a further switch control pattern for the inverter switches,
- (i.) modeling a response of the inverter under the assumptions that the switches are to be controlled in accordance with the selected further switch control pattern and that the inverter output voltage is at the particular level between the first and second voltages during the dwell interval,
- (j.) determining whether the modeled inverter response satisfies the certain criterion,
- (k.) storing the selected further switch control pattern in the memory if the modeled inverter response satisfies the certain criterion and
- (l.) retrieving the selected further switch control pattern from the memory and operating the inverter switches in accordance with the selected further switch control pattern when the operational parameter of the inverter is substantially at the further level.

19. The method of claim 18, wherein the particular level is assumed to be substantially constant throughout the dwell interval.

20. The method of claim 19, wherein the particular level is substantially midway between the first and second voltages.

21. The method of claim 18, wherein the operational parameter comprises load magnitude.

22. The method of claim 18, wherein each switch control pattern comprises a pulse-width modulation pattern.

23. The method of claim 18, wherein the step of determining whether the modeled inverter response satisfies a certain criterion comprises the step of detecting a magnitude of a harmonic in the inverter output voltage and ascertaining whether the detected harmonic magnitude is greater than a certain magnitude.

* * * * *